Patented Oct. 27, 1942

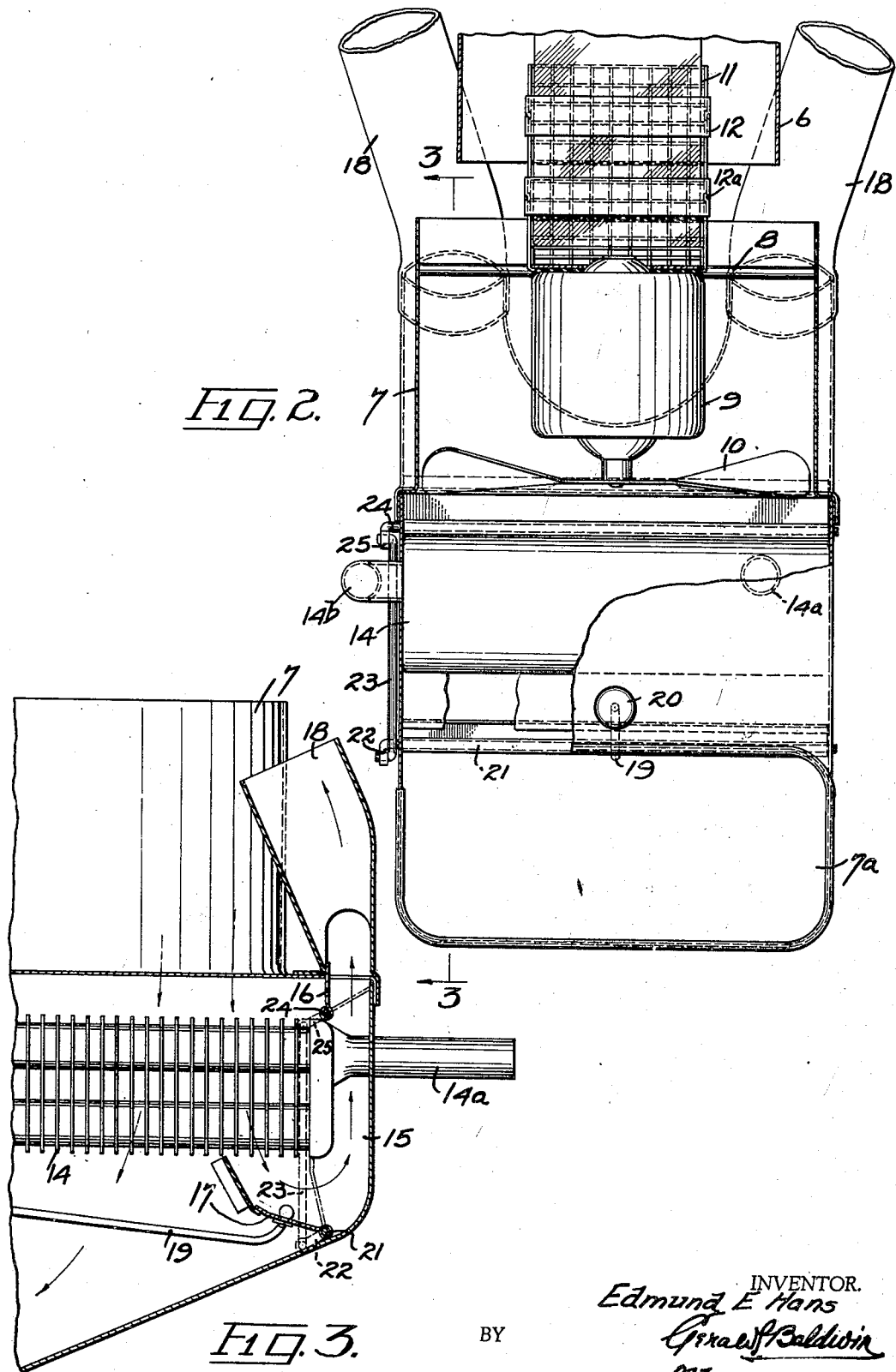

2,300,357

UNITED STATES PATENT OFFICE 2,300,357

COMBINATION HEATING AND COOLING UNIT FOR MOTOR VEHICLES

Edmund E. Hans, Detroit, Mich.

Application December 11, 1940, Serial No. 369,649

3 Claims. (Cl. 257—137)

This invention relates to improvements in combination heating and cooling units for motor vehicles. It is an object of the invention to provide such a unit including a single fan having a heating means positioned adjacent its discharge side and a cooling means located adjacent its suction side so that either heated or cooled air may be delivered into the vehicle body from the unit by the fan.

Another object of the invention is to provide such a unit wherein means are provided for delivering a portion of the air into the vehicle body adjacent the floor and the remainder into the vehicle intermediately of its height, and includes selective means for passing the latter portion of the air either through the heating means or not, so that while heated air is being discharged adjacent the floor, the air discharged intermediately of the height of the vehicle may be either heated or not as desired.

A further object of the invention is to provide such a unit which is compact and relatively cheap to manufacture, simple to install and efficient in operation.

It may also here be noted that while the air passing through the unit, for heating or cooling, may be partly fresh air from outside and partly re-circulated air from within the vehicle body, or entirely re-circulated air, the construction herein shown whereby this is rendered possible does not form a portion of this invention and has been already specifically described and claimed in my application Serial No. 270,143, subsequently refiled under Serial No. 450,317. Moreover the construction of a cooling unit alone for the same purpose is described and claimed in a co-pending application Serial No. 369,650.

Having thus briefly stated some of the objects and advantages of the invention, I will now proceed to describe it in detail with the aid of the accompanying drawings, in which:

Figure 2 shows a front view thereof, and

Figure 3 is a sectional view taken on the line 3—3 of Figure 2.

Figure 1:
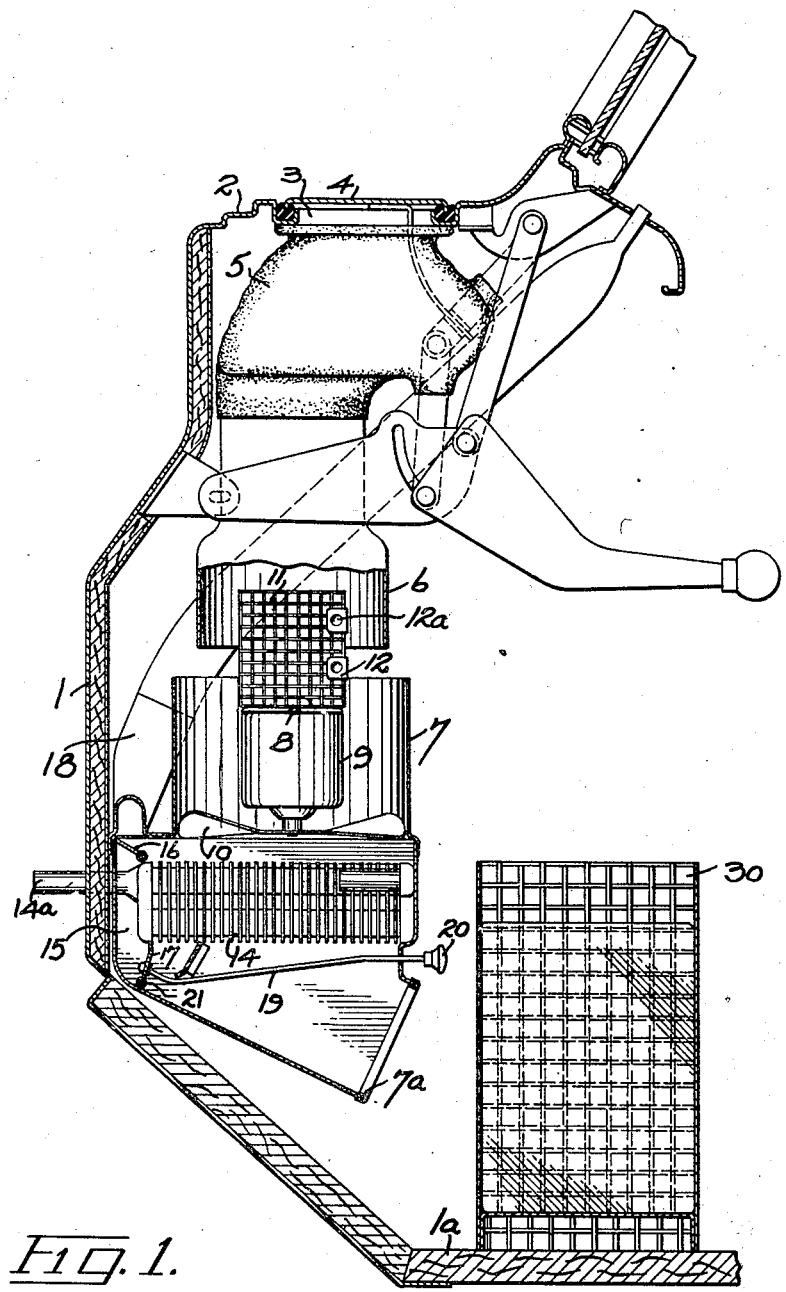
Figure 1 illustrates a sectional elevation of the invention mounted in position in a vehicle body.

Referring to the drawings, I designates a portion of a conventional automobile body having a cowl 2 through which an opening 3 is provided which may be closed by a member 4. Extending within the body from beneath the opening 3 is a tubular connection 5 terminating at its lower extremity in a vertical duct 6 preferably made of flexible material. Suitably mounted in the body 1 is a housing 7, open at the top, in alignment with the duct 6 and spaced from the latter. The bottom of the housing is provided with a downwardly and rearwardly directed outlet 7a through which air is adapted to be rearwardly discharged in the body towards the floor 1a.

Supported in the housing 7 intermediately of its height, as by a spider 8, is a vertical motor 9 on the downwardly projecting shaft of which a fan 10 is secured. Supported in the housing 7 on the suction side of the fan 10, and in the present instance upon the top of the motor 9, is a refrigerant container 11 having three vertical wire mesh sides and removable channel-shaped closures 12 extending across the fourth side to prevent pieces of dry ice or other refrigerant within the container from falling out. In the construction shown the flexed extremities of the closures are provided with resilient portions 12a to engage the opposite wire mesh sides of the container 11. However other means may be provided either for holding the closures 12 in position, or for closing the fourth side of the container.

Mounted also in the housing 7 transversely thereof and spaced beneath the discharge side of the fan 10 is a heater core 14 provided with appropriate connections 14a and 14b to serve as an inlet and an outlet for hot water or steam passing thereto through piping, not shown. Formed also in the housing 7 transversely of its entire width and in alignment with the heater core 14 is a chamber 15. Extending the full width of the housing to control passages between the main portion of the interior of the latter and the chamber 15 are pivoted shutters 16 and 17 located above and beneath the said heater core respectively. Mounted for reciprocation in the housing 7 is an operating rod 19 terminating outside the housing in a knob 20 and connected at its opposite extremity to the bottom shutter 17 which is secured to a rod 21 pivotally supported in the said housing. Fixed also on the rod 21, preferably outside the housing, is an arm 22 having a link 23 pivoted thereon. The top shutter 16 is fixed on a rod 24 supported for rotation in the housing 7, and secured also to the rod 24 is an arm 25 to which the opposite extremity of the link 23 is pivotally connected. Thus movement of the operating knob 20 imparts movement directly to the bottom shutter 17 and also to the top shutter 16 through the arm 22, link 23 and arm 25. In Figure 3 the bottom shutter 17 is shown open and the top shutter 16 closed, so that air enters the chamber 15 after passing through the heater core 15, and in Figure 1 the bottom shutter 17 is closed and the top shutter 16 open so that the air entering the chamber 15 does not pass through the core 14.

Extending upwardly from the chamber 15 are conduits 18 through which air from the former is adapted to be discharged into the body of the vehicle intermediately of its height in a rearward direction so that it flows back adjacent the roof thereof for supplying fresh air which may be tempered (either warmed or cooled) in the upper portion of the vehicle. Thus when the unit is being used for heating either heated or unheated air may be discharged through the conduits 18 while heated air is discharged through the housing outlet 7a rearwardly adjacent the floor. However since the refrigerant container 11 is positioned on the suction side of the fan 10 all the air discharged either through the conduits 18 or the housing outlet 7a must pass adjacent the container 11 and in proximity to a refrigerant (such as dry ice) therein when the unit is being employed for cooling purposes.

As any cooling medium, such as dry ice (solidified carbon dioxide), gradually melts in the container 11 the invention also contemplates the provision of a receptacle 30 for the storage of a reserve supply for replenishment purposes. This receptacle is preferably also provided with a wire mesh construction and is positioned in front of the housing outlet 7a so that air discharged from the latter is directed against the contents of the receptacle. Due to the fact that the cooled air discharged against the latter is at a lower temperature than other adjacent air, the ice melts at a low rate, and at the same time this reserve is effectively employed for further lowering the temperature of the air immediately after its discharge from the unit. Due to the ready flexibility of the duct 6 the latter may be easily raised or otherwise sufficiently displaced to permit easy loading of the container 11.

The arrangement herein contemplated for introducing air into the housing 7 is the same as that shown in my application Serial No. 270,143 subsequently refiled under Serial No. 450,317, wherein air enters through the cowl opening 3 when the member 4 is in open position, and flows through the connection 5 and flexible duct 6 into the top of the housing 7, and at the same time this flow, particularly when the velocity is great, induces a further flow of air through the housing from within the body 1.

From the foregoing it will be readily seen that I have devised a simple unit including a housing through which air is adapted to flow and a single fan therein having a refrigerant container on its suction side and a heater core on its discharge side. The housing is also provided both with a bottom outlet through which a portion of the air is discharged towards the back of the vehicle body adjacent the floor, and upwardly directed ducts through which the remainder of the air is discharged rearwardly adjacent the roof, and selective means for passing some of the air to the ducts either prior or subsequent to its passage through the heater core.

While the preferred embodiment of my combined unit has been described and shown it is understood that alterations may be made thereto provided these alterations fall within the scope of the appended claims.

What I claim is:

1. A unit of the character described comprising a housing having an inlet at its upper extremity and an outlet towards its other extremity, a fan mounted for rotation in the housing, a heater core in the housing beneath the fan, a chamber in the housing in horizontal alignment with the heater core, shutters above and beneath the heater core controlling passages from the interior of the main portion of the housing into the chamber, means for moving the shutters whereby one is opened and the other closed, the heater core offering sufficient resistance to the air flow therethrough to divert some air into the passage above said core when the shutter controlling that passage is open, and the shutter controlling the passage beneath the heater core being so constructed and arranged that it diverts some air into that passage when in open position, and upwardly projecting conduits extending from the chamber through which some air is adapted to be discharged from the housing either prior or subsequent to its passage through the heater core while the remainder of the air discharged by the fan passes through said outlet.

2. A unit comprising the combination set forth in claim 1, wherein the housing has a laterally directed outlet whereby the passage of air from the housing is somewhat restricted to thereby correspondingly increase the air flow through the chamber when the passage beneath the core is open.

3. A unit of the character described comprising a housing having an inlet adjacent one extremity and an outlet adjacent the other extremity, a fan mounted for rotation in the housing, a heater core in the housing between the fan and the outlet, a chamber formed on one side of the housing in alignment with the heater core, a shutter between the fan and the heater core, a second shutter between the heater core and the outlet, each of said shutters controlling a passage from the main portion of the housing into the chamber, means for moving the shutters whereby one is opened and the other closed, the heater core offering sufficient resistance to the air flow to divert some air into the passage between the fan and the heater core when the shutter controlling that passage is open, and the shutter controlling the passage between the heater core and the outlet being so constructed and arranged that it diverts some air into that passage when in open position, and upwardly projecting conduits extending from the chamber through which some air is adapted to be discharged from the housing either prior or subsequent to its passage through the heater core while the remainder of the air is discharged through said outlet.

EDMUND E. HANS.